United States Patent
Dargein et al.

(10) Patent No.: US 12,162,137 B2
(45) Date of Patent: Dec. 10, 2024

(54) DEVICE FOR HANDLING A SHAFT FORMING A PIVOTING LINK BETWEEN AT LEAST TWO PARTS

(71) Applicant: Airbus Operations SAS, Toulouse (FR)

(72) Inventors: Sébastien Dargein, Toulouse (FR); Jean-Paul Lacampagne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 799 days.

(21) Appl. No.: 17/393,716

(22) Filed: Aug. 4, 2021

(65) Prior Publication Data
US 2022/0040865 A1 Feb. 10, 2022

(30) Foreign Application Priority Data
Aug. 6, 2020 (FR) ........................ 2008331

(51) Int. Cl.
*B23P 19/02* (2006.01)
*B23P 19/12* (2006.01)
(Continued)

(52) U.S. Cl.
CPC ........... *B25J 15/0038* (2013.01); *B23P 19/02* (2013.01); *B23P 19/12* (2013.01); *B25B 27/023* (2013.01); *B23P 19/022* (2013.01); *B23P 19/025* (2013.01); *B23P 19/10* (2013.01); *B23P 2700/11* (2013.01); *B25B 27/02* (2013.01); *Y10T 29/49895* (2015.01); *Y10T 29/53848* (2015.01);
(Continued)

(58) Field of Classification Search
CPC ....... B23P 19/022; B23P 19/025; B23P 19/12; B23P 2700/11; B25B 27/02; B25B 27/023; Y10T 29/49895; Y10T 29/53857; Y10T 29/53848; Y10T 29/53913; Y10T 29/53917

See application file for complete search history.

(56) References Cited

U.S. PATENT DOCUMENTS 3,986,383 A * 10/1976 Petteys .................. B21D 39/20
D8/51
5,074,536 A * 12/1991 McConkey ............ B23Q 3/183
269/48.1
(Continued)

FOREIGN PATENT DOCUMENTS

FR 3074073 A1 5/2019

*Primary Examiner* — Jermie E Cozart
(74) *Attorney, Agent, or Firm* — Greer, Burns & Crain, Ltd.

(57) ABSTRACT

A device for handling a shaft forming a pivoting link between two parts, including a body configured to be inserted into the shaft, and blocked in translation with respect to the shaft along a longitudinal axis in a first direction, a compression nut screwed onto a threaded outer portion of the body along the axis in a second direction opposite the first direction, a bearing member positioned against one of the parts, and a return member configured to be compressed between the compression nut and the bearing member by the screwing of the compression nut and to be decompressed in the second direction under the action of the compression nut. This device allows the shaft of the pivoting link to be handled rapidly, and makes it possible to control the load applied onto the shaft during the handling thereof.

6 Claims, 5 Drawing Sheets

(51) Int. Cl.
  *B25B 27/02* (2006.01)
  *B25J 15/00* (2006.01)
  *B23P 19/10* (2006.01)
(52) U.S. Cl.
  CPC .... *Y10T 29/53857* (2015.01); *Y10T 29/53913* (2015.01); *Y10T 29/53917* (2015.01)

(56) References Cited

U.S. PATENT DOCUMENTS

| | | | |
|---|---|---|---|
| 8,511,133 B1 * | 8/2013 | Chen | B21D 41/028 269/48.1 |
| 10,994,380 B2 | 5/2021 | Comagro et al. | |
| 2019/0160606 A1 * | 5/2019 | Colmagro | B64F 5/10 |

* cited by examiner

DEVICE FOR HANDLING A SHAFT FORMING A PIVOTING LINK BETWEEN AT LEAST TWO PARTS

CROSS-REFERENCES TO RELATED APPLICATIONS

This application claims the benefit of the French patent application No. 2008331 filed on Aug. 6, 2020, the entire disclosures of which are incorporated herein by way of reference.

FIELD OF THE INVENTION

The present application relates to a device for handling a shaft forming a pivoting link between first and second parts.

BACKGROUND OF THE INVENTION

The application FR 3 074 073 A1 discloses a device for handling a shaft intended to create a pivoting link between a first part and a second part. This handling device makes it possible to engage a hollow shaft in orifices of the first and second parts, but also disengage the hollow shaft from these orifices. The handling device notably comprises a module for extracting the shaft which is engaged in the orifice or orifices of the first and second parts. The extraction module comprises a detection system configured to detect a resistance likely to be exerted on the shaft and tending to prevent the disengagement thereof. The extraction module is configured to disengage the shaft from the orifice or orifices of the first and second parts if the resistance detected by the detection system is below a predetermined threshold.

The present invention aims to propose an alternative solution to this device.

SUMMARY OF THE INVENTION

To this end, a subject of the invention is a device for handling a shaft having an orifice emerging at its center and forming a hollow shaft and a link between first and second parts.

According to the invention, the device comprises:
  a body extending along a longitudinal axis, configured to be inserted into the orifice, the body having a threaded outer portion and a bore extending along the longitudinal axis,
  a threaded rod inserted into the bore of the body and having first and second ends,
  a butterfly nut mounted to translate by screwing onto the first end of the threaded rod along the longitudinal axis in a second direction,
  an expandable clamping ring arranged on the second end of the threaded rod, and that can be deformed under the action of the butterfly nut between a free position in which the body can move in translation with respect to the shaft along the longitudinal axis and a deformed position in which the translation of the body with respect to the shaft along the longitudinal axis in a first direction opposite the second direction is blocked,
  a compression nut screwed onto the threaded outer portion of the body along the longitudinal axis in the second direction,
  a bearing member intended to be positioned against one of the first or second parts, and
  return means positioned between the compression nut and the bearing member and configured to be compressed between the compression nut and the bearing member by the screwing of the compression nut and to be decompressed in the second direction under the action of the compression nut.

Advantageously, the device according to the invention allows a shaft forming a pivoting link between two parts to be handled simply and rapidly. Thus, the device simplifies and speeds up the maintenance operations for changing (i.e., extracting and inserting) a shaft of a pivoting link.

Furthermore, this device makes it possible to control the load applied to the shaft during the extraction and the insertion thereof in the orifices of the parts so as to form the pivoting link. The load which is applied onto the shaft during the handling thereof is thus constant and controlled.

Furthermore, this device allows the shaft to be handled from a single side of the pivoting link.

According to another feature, the expandable clamping ring comprises:
  a nut of tapered form bedded onto the second end of the threaded rod, and
  a ring that can be deformed in a direction transversal to the longitudinal axis and having at least one groove, the ring being secured to the body, the groove of the ring being configured to be deformed by the tapered form of the nut during the screwing of the butterfly nut.

According to another feature, the compression nut comprises:
  a washer that can move in translation along the longitudinal axis and in rotation about the longitudinal axis, and comprising notches, and
  a locknut screwed onto the threaded portion of the body and comprising notches of a form complementing the form of the notches of the washer, the notches of the locknut being configured to cooperate with the notches of the washer so as to block the translation of the washer along the longitudinal axis in the first direction.

According to another feature, the device comprises an abutment configured to stop the compression of the return means. This abutment makes it possible to limit the load which is applied to the shaft, and make it constant by controlling the maximum compression ratio of the return means.

According to another feature, the device comprises a handle arranged at an end of the body. This handle makes it possible to simplify the handling of the body.

The invention relates also to a method for handling a shaft having an orifice emerging at its center and forming a hollow shaft and a link between first and second parts, by means of a handling device comprising a body extending along a longitudinal axis and having a threaded outer portion and a bore extending along the longitudinal axis, a threaded rod inserted into the bore of the body and having first and second ends, a butterfly nut screwed onto the first end of the threaded rod, an expandable clamping ring arranged on the second end of the threaded rod, a compression nut comprising a washer comprising notches and a locknut screwed onto the threaded outer portion of the body and comprising notches of a form complementing the form of the notches of the washer, a bearing member positioned against one of the first or second parts, and return means positioned between the washer and the bearing member.

According to the invention, the method comprises the steps of:
  insertion of the body into the orifice;
  screwing of the butterfly nut onto the threaded rod along the longitudinal axis in a second direction so as to deform the expandable clamping ring and to block the translation of the body with respect to the shaft along the longitudinal axis in a first direction opposite the second direction;

translation of the washer along the longitudinal axis in the second direction so as to compress the return means; and screwing of the locknut so as to make the notches of the locknut cooperate with the notches of the washer and block the translation of the washer along the longitudinal axis in the first direction; and rotation of the washer about the longitudinal axis so as to make the notches of the washer slip against the notches of the locknut so as to decompress the return means in the second direction.

BRIEF DESCRIPTION OF THE DRAWINGS

Other features and advantages will emerge from the following description of the invention, a description given purely by way of example, in light of the attached drawings in which.

DETAILED DESCRIPTION OF THE PREFERRED EMBODIMENTS

In FIGS. 1 to 4, a pivoting link between a first part 12 and a second part 14 is represented.

According to one application, the first part 2 is a cap of an aircraft nacelle, and the second part 14 is the rest of the nacelle (or vice versa).

According to another application, the first part 12 corresponds to a pylon and the second part 14 corresponds an aircraft engine (or vice versa).

The first part 12 comprises a yoke having a first branch 20.1 and a second branch 20.2, each branch 20.1, 20.2 having an orifice 16, and the second part 14 comprises an arm 22 positioned between the branches 20.1, 20.2 of the yoke, and has an orifice 18. The orifices 16, 18 are coaxial. The orifices 16, 18 are smooth, that is to say, not threaded.

A shaft 10 is positioned in the coaxial orifices 16, 18 provided in the branches 20.1, 20.2 of the yoke and the arm 22. The shaft 10 links the arm 22 and the branches 20.1, 20.2 of the yoke, and thus forms a pivoting link between the yoke and the arm 22. The shaft 10 forms a pivoting axis X.

Hereinafter in the description, a longitudinal direction is a direction parallel to the pivoting axis X, and a radial direction is a direction at right angles to the pivoting axis X. A longitudinal plane is a plane which passes through the pivoting axis X, and a transverse plane is a plane at right angles to the pivoting axis X.

The branches 20.1, 20.2 of the yoke each comprise an inner face 21.1, 21.2 oriented towards the other branch 20.1, 20.2 and an outer face 23.1, 23.2 opposite the inner face 21.1, 21.2. The inner faces 21.1, 21.2 and the outer faces 23.1, 23.2 are parallel to one another and positioned in transverse planes. For each branch 20.1, 20.2, an orifice 16 emerges at an inner face 21.1, 21.2 and an outer face 23.1, 23.2, and has an axis of revolution at right angles to the inner and outer faces.

The arm 22 is thus positioned between the inner faces 21.1, 21.2 of the branches 20.1, 20.2 of the yoke and comprises lateral faces 25, 27 parallel to one another and positioned in transverse planes. The orifice 18 emerges at the lateral faces 25, 27 and has an axis of revolution at right angles thereto.

The shaft 10 is cylindrical and has an axis of revolution coinciding with the pivoting axis X. The shaft 10 extends between first and second end faces 29, 31 which extend in planes transversal to the pivoting axis X. The shaft 10 is a hollow shaft which has an orifice 11 centered on the pivoting axis X and emerging on the end faces 29, 31.

The outer diameter De (dimension in a direction radial to the pivoting axis X furthest away from the pivoting axis X) of the shaft 10 is substantially equal to the diameter D16 of the orifices 16 of the first part 12 and to the diameter D18 (dimension in a direction radial to the pivoting axis X) of the orifice 18 of the second part 14. The shaft 10 is inserted into the orifices 16, 18 of the parts 12, 14 by slip-fitting.

According to the invention, a device 30 allowing the shaft 10 to be handled comprises a body 32 of cylindrical form and which extends along a longitudinal axis X1. The body 32 extends between first and second end faces 33, 35 which extend in planes transversal to the longitudinal axis X1. The body 32 is configured to be inserted into the orifice 11 of the shaft 10 along the longitudinal axis X1, in a second direction (represented by the arrow F2 in FIG. 1), called direction of engagement or of insertion of the shaft 10. The body 32 and the shaft 10 are coaxial when the body 32 is introduced into the shaft 10, and the longitudinal axis X1 then coincides with the pivoting axis X. The body 32 has a diameter D32 that is substantially equal to, even slightly less than, the inner diameter Di (dimension in a direction radial to the pivoting axis X closest to the pivoting axis X) of the shaft 10.

The translation of the body 32 with respect to the shaft 10 along the longitudinal axis X1 (coinciding with the pivoting axis X) in a first direction (represented by the arrow F1 in FIG. 4), called direction of disengagement or of extraction of the shaft 10, opposite the second direction F2, is blocked. For that, the device 30 comprises a threaded rod 34, a butterfly nut 38 (also called lug nut) and an expandable clamping ring 42.

The body 32 comprises first and second ends 48, 52 and has a bore (not visible) extending along the longitudinal axis X1 and into which a threaded rod 34 is inserted. The bore of the body 32 is smooth, that is to say, not threaded.

The length L34 (dimension in a direction longitudinal to the pivoting axis X) of the threaded rod 34 is greater than the length L32 of the body 32, which is greater than the length L10 of the shaft 10.

The butterfly nut 38 is arranged at a first end 36 of the threaded rod 34, and is screwed onto the latter along the longitudinal axis X1 in the second direction F2.

The expandable clamping ring 42 is arranged at a second end 40 of the threaded rod 34, and is configured to be deformed in a direction transversal to the longitudinal axis X1 during the screwing of the butterfly nut 38. The expandable clamping ring 42 is deformable, under the action of the butterfly nut 38, between a free position in which the body 32 can move in translation with respect to the shaft 10 along the longitudinal axis X1 and a deformed position in which the translation of the body 32 with respect to the shaft 10 along the longitudinal axis X1 in the first direction F1 is blocked.

Figure 1:
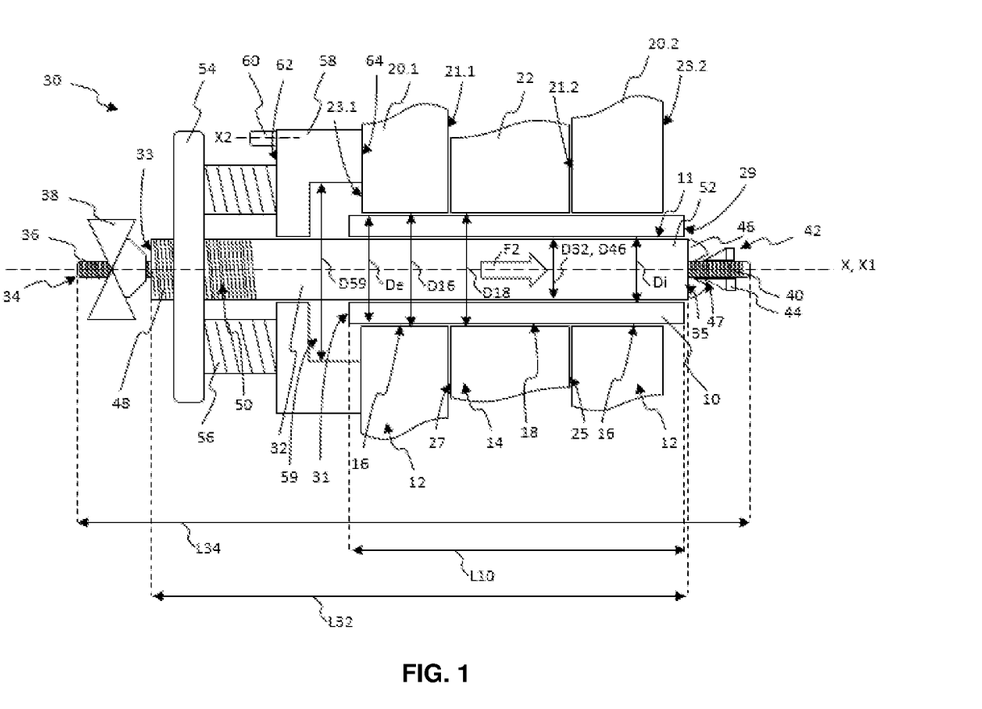
FIG. 1 is a cross-sectional view of a pivoting link between first and second parts formed by a shaft and of a device for handling the shaft, according to an embodiment of the invention.

More specifically, the expandable clamping ring 42 comprises a nut 44 of tapered form which is bedded onto the second end 40 of the threaded rod 34, and a ring 46 that can be deformed in a direction transversal to the longitudinal axis X1 which is arranged on the second end 40 of the threaded rod 34. The ring 46 has one or more grooves 47 centered on the longitudinal axis X1. The ring 46 is secured to the second face 35 of the body 32. The ring 46 has, in the non-deformed position as represented in FIG. 1, a diameter D46 substantially equal to the diameter D32 of the body 32. The butterfly nut 38 and the nut 44 are arranged on the threaded rod 34, at a distance from the body 32. The groove 47 of the ring 46 is configured to be deformed by the tapered form of the nut 44 during the screwing of the butterfly nut 38 onto the threaded rod 34.

Figure 2:
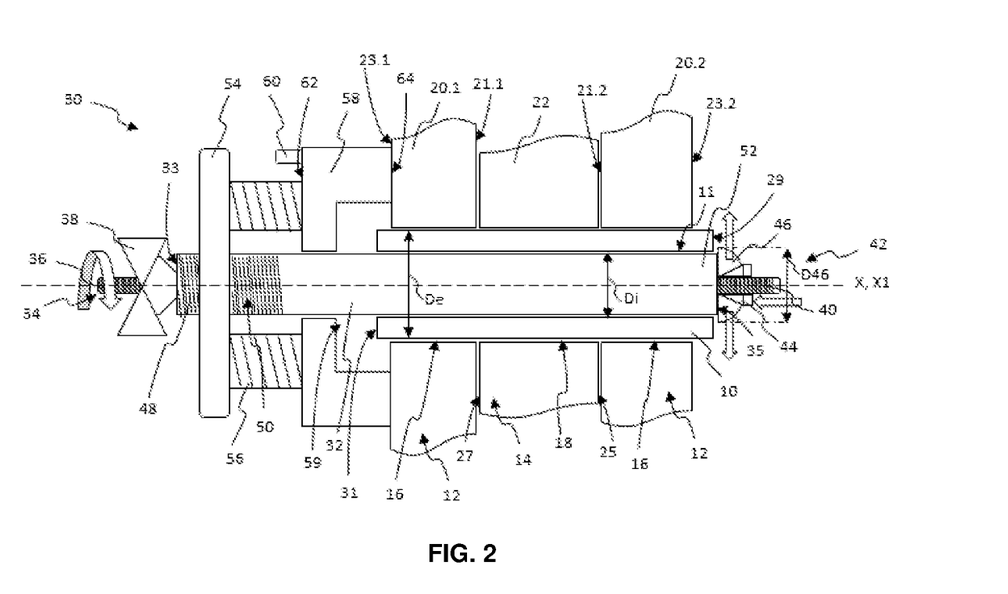
FIG. 2 is a cross-sectional view of a pivoting link between first and second parts formed by a shaft and of a device for handling the shaft, according to an embodiment of the invention.

The screwing of the butterfly nut 38 onto the threaded rod 34 drives a displacement of the threaded rod 34 along the longitudinal axis X1 in the first direction F1. During the screwing of the butterfly nut 38, the nut 44, which is bedded onto the threaded rod 34, is driven in translation along the longitudinal axis X1, and then approaches the ring 46 and the butterfly nut 38. The screwing of the butterfly nut 38 causes the tapered form of the nut 44 to be brought into contact with the groove or grooves 47 of the ring 46, followed by a deformation of the ring 46. The nut 44 is secured to the end 40 of the treaded rod 50, and not simply screwed thereon, in order to avoid a loosening of the nut 44 when the butterfly nut 38 is screwed at the other end 36 of the threaded rod 50. As represented in FIG. 2, during the screwing, the butterfly nut 38 approaches the body 32, then comes into contact with the first face 33 of the body 32; also, the nut 44 approaches the ring 46, which is secured to the body 32, then comes into contact with the groove or grooves 47 of the ring 46, engages in the groove or grooves 47 and deforms them by moving them apart from one another. Once the butterfly nut 38 has been screwed, the latter bears against the first end 48 of the body 32; also, the expandable clamping ring 42, composed of the nut 44 engaged in the groove or grooves 47 of the ring 46 such that the ring 46 is deformed, is secured to the second end 52 of the body 32.

In the deformed position represented in FIG. 2, the ring 46 has a diameter D46 strictly greater than the diameter Di of the shaft 10, and less than or equal to the diameter De of the shaft 10. In the deformed position, the ring 46 is therefore secured to the body 32 and bearing against the shaft 10. The deformation of the ring 46 in a direction transversal to the longitudinal axis X1 during the screwing of the butterfly nut 38 thus blocks the translation of the body 32 with respect to the shaft 10 along the longitudinal axis X1 in the first direction F1. Thus, the nut 44 and the ring 46 in the deformed position have a role of blocking of the translation of the body 32 with respect to the shaft 10 in the first direction F1.

The expandable clamping ring 42 allows the shaft 10 to be centered when the latter is inserted into the orifices 16, 18 of the first and second parts 12, 14; and allows the shaft 10 to be pulled when the latter is extracted from these orifices 16, 18.

The body 32 also has a threaded outer portion 50 at its end 48, which is the end of the body 32 closest to the butterfly nut 38 and to the first end 36 of the threaded rod 34.

The device 30 comprises a compression nut 54, which is mounted on the threaded outer portion 50 of the body 32. The compression nut 54 is screwed onto the threaded outer portion 50 of the body 32 along the longitudinal axis X1 in the second direction F2.

The device 30 also comprises a bearing member 58 positioned against one of the first or second parts 12, 14, here against the outer face 23.1 of the branch 20.1 of the yoke. The bearing member 58 is coaxial to the body 32, and extends around a part of the body 32. The bearing member 58 comprises a bore 59, centered on the longitudinal axis X1, and which has a diameter D59 greater than the outer diameter De of the shaft 10. The bearing member 58 comprises first and second surfaces 62, 64 extending in planes transversal to the longitudinal axis X1. The surface 64 of the bearing member 58 is arranged against the outer face 23.1 of the branch 20.1 of the first part 12.

The device 30 also comprises return means 56 positioned between the compression nut 54 and the bearing member 58. The return means 56 are configured to be compressed and to be decompressed between the compression nut 54 and the bearing member 58, along the longitudinal axis X1. The return force of the return means 56 is therefore a translation force along the longitudinal axis X1.

According to one embodiment, the return means 56 comprise a spring. The return means can revolve freely about the longitudinal axis X1. According to another embodiment, the return means 56 comprise a plurality of springs positioned around a part of the body 32.

According to one configuration, an abutment 60 configured to stop the compression of the return means 56 is fixed onto the surface 62 of the bearing member 58. The abutment 60 extends longitudinally along a longitudinal axis X2 parallel to the longitudinal axis X1, from the surface 62 of the bearing member 58, towards the compression nut 54.

Figure 3:
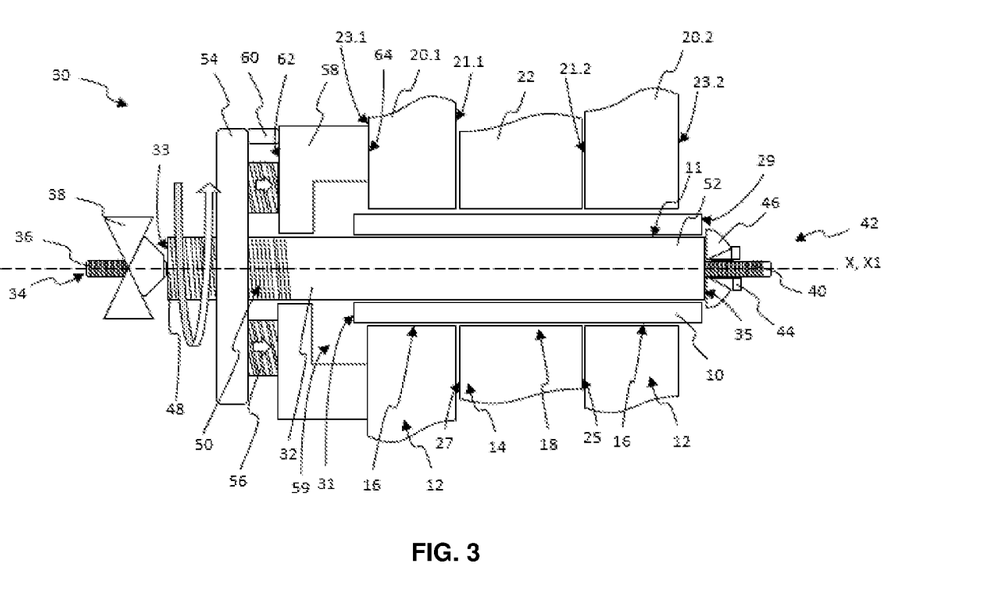
FIG. 3 is a cross-sectional view of a pivoting link between first and second parts formed by a shaft and of a device for handling the shaft, according to an embodiment of the invention.

The screwing of the compression nut 54 onto the threaded outer portion 50 of the body 32 causes a compression of the return means 56 along the longitudinal axis X1 in the second direction F2, that is to say, against the bearing member 58. Thus, the return means 56 are compressed between the compression nut 54 and the bearing member 58. The compression nut 54 is screwed onto the treaded outer portion 50 until the abutment 60 is reached, as represented in FIG. 3, which stops the screwing.

The length of the abutment 60 can be adjusted, as a function of the return force of the return means 56.

Figure 4:
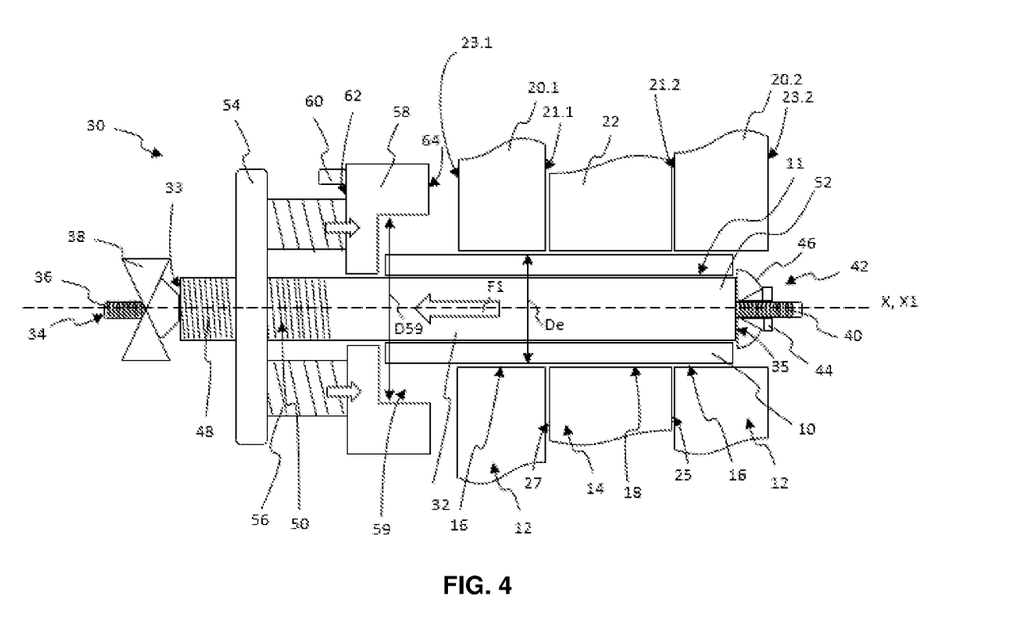
FIG. 4 is a cross-sectional view of a pivoting link between first and second parts formed by a shaft and of a device for handling the shaft, according to an embodiment of the invention.

As represented in FIG. 4, the return force of the return means 56 is then exerted along the longitudinal axis X1 in the second direction F2, and more specifically towards the bearing member 58. Thus, under the effect of their return force (and of the action of the compression nut 54, as described in detail hereinbelow), the return means 56 are decompressed, and the bearing member 58 translates along the longitudinal axis X1, moving away from the outer face 23.1 of the branch 20.1 of the first part 12. In fact, since the compression nut 54 is screwed (combined rotational movement about the longitudinal axis X1 and translational movement along the longitudinal axis X1) on the body 32, the return force of the return means 56, which is a translation force, is transmitted to the bearing member 58, which is not blocked in translation along the longitudinal axis X1. The decompression of the return means 56 causes a translation of the device 30 along the longitudinal axis X1, moving away from the first part 12. More specifically, since the return means 56 are fixed to the compression nut 54, which is itself screwed onto the body 32, the return force of the return means 56 causes a translation of the body 32, and therefore of the shaft 10, since the latter are linked in translation along the longitudinal axis X1, in the first direction F1, via the expandable clamping ring 42. The shaft 10 is thus partially disengaged from the orifices 16, 18 of the first and second parts 12, 14. The shaft 10 is then situated partially in the bore 59 of the bearing member 58.

The operation of the compression nut 54 is detailed in FIGS. 5 to 8.

The compression nut 54 comprises a washer 70 that is free in translation along the longitudinal axis X1 and in rotation about the longitudinal axis X1. The washer 70 extends in a plane transversal to the longitudinal axis X1, and has first and second faces 71, 73 opposite to one another. The washer 70 comprises notches 72 arranged over the entire periphery of its first face 71.

The compression nut 54 also comprises a locknut 66 screwed onto the threaded outer portion 50 of the body 32. The locknut 66 extends in a plane transversal to the longitudinal axis X1, and has first and second faces 75, 77 opposite one another. The locknut 66 comprises notches 68, of a form complementing the form of the notches 72, arranged over the entire periphery of its first face 75. For example, in FIGS. 5 to 8, the notches 68, 72 have a triangular based right-angle prism form. Obviously, this form of the notches 68, 72 is not limiting and other forms are possible for these notches 68, 72.

The first face 71 of the washer 70 is oriented towards the first face 75 of the locknut 66. The notches 68 of the locknut 66 and the notches 72 of the washer 70 are configured to cooperate together so as to block the translation of the washer 70 along the longitudinal axis X1 in the first direction F1.

The washer 70 can move in translation along the longitudinal axis X1, notably in the second direction F2, so as to cause a compression of the return means 56. The locknut 66 is configured to keep the return means 56 in their state of compression.

As represented in FIGS. 5 to 8, the return means 56 are arranged between first and second retaining discs 74, 76 which extend in planes transversal to the longitudinal axis X1. The first retaining disc 74 extends parallel to the surface 73 of the washer 70, and the second retaining disc 76 extends parallel to the surface 62 of the bearing member 58. Each retaining disc 74, 76 has an inner surface 78, 79 oriented towards the other retaining disc 74, 76 and an outer surface 80, 81 opposite the inner surface 78, 79. The return means 56 are fixed onto the inner surfaces 78, 79 of the retaining discs 74, 76.

According to a configuration represented in FIGS. 1 to 4, the retaining disc 74 and the washer 70 are formed in a single piece. According to another configuration represented in FIGS. 5 to 8, the retaining disc 74 and the washer 70 are distinct from one another.

According to a configuration represented in FIGS. 1 to 4, the retaining disc 76 and the bearing member 58 are formed in a single piece. According to another configuration represented in FIGS. 5 to 8, the retaining disc 76 and the bearing member 58 are distinct from one another.

According to one configuration, the abutment 60 is fixed onto the inner surface 79 of the retaining disc 76. The abutment 60 extends longitudinally along a longitudinal axis X2 parallel to the longitudinal axis X1, from the inner surface 79 of the retaining disc 76, towards the retaining disc 74. According to a configuration that is not represented, the abutment 60 is fixed onto the inner surface 78 of the retaining disc 74, and extends longitudinally along the longitudinal axis X2, from the inner surface 78 of the retaining disc 74, towards the retaining disc 76. Thus, the abutment 60 is located between the retaining disc 74 and the retaining disc 76.

When the notches 72 of the washer 70 are free, a translation of the washer 70 along the longitudinal axis X1 in the second direction F2, that is to say, towards the retaining disc 74, causes a compression of the return means 56. In fact, during the translation of the washer 70, the latter comes into contact with the retaining disc 74, then, under the effect of its translation force, compresses the return means 56.

Figure 5:
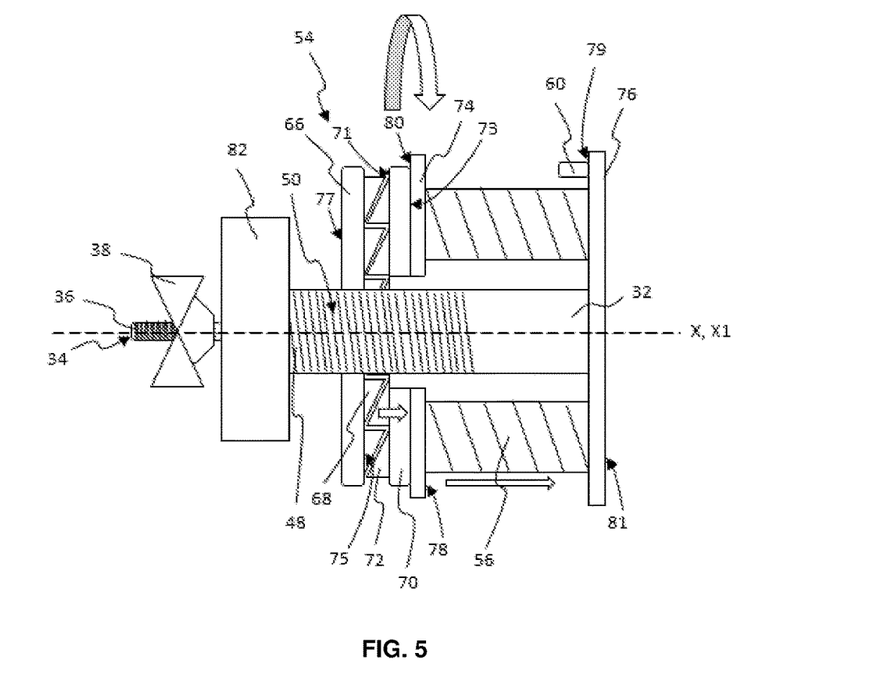
FIG. 5 is a cross-sectional view of a part of a device for handling a shaft forming a pivoting link between first and second parts, according to an embodiment of the invention.

As represented in FIG. 5, the notches 72 of the washer 70 cooperate with the notches 68 of the locknut 66. In this case, a rotation of the washer 70 about the longitudinal axis X1 results in a releasing of the notches 72 of the washer 70. Next, a translation of the washer 70 along the longitudinal axis X1 in the second direction F2, causes a compression of the return means 56.

Figure 6:
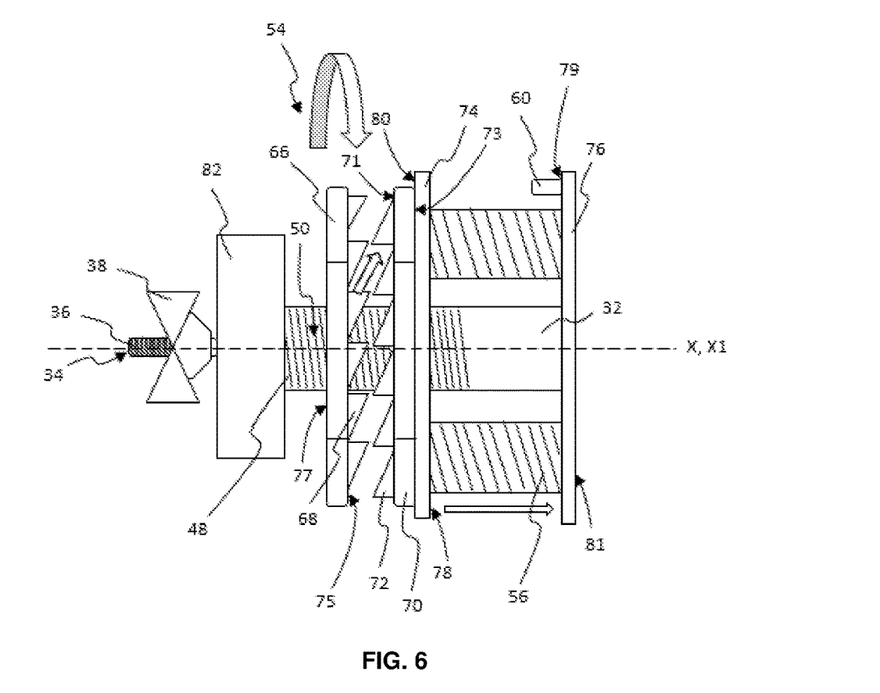
FIG. 6 is a cross-sectional view of a part of a device for handling a shaft forming a pivoting link between first and second parts, according to an embodiment of the invention.

Once the return means 56 are compressed by the washer 70, a screwing of the locknut 66 onto the threaded outer portion 50 of the body 32 results in a blocking of the translation of the washer 70 along the longitudinal axis X1 in the first direction F1, and therefore a blocking of a decompression of the return means 56 along the longitudinal axis X1 in the first direction F1. In fact, as represented in FIG. 6, the screwing of the locknut 66 causes a rotational movement about the longitudinal axis X1 and a translational movement along the longitudinal axis X1 of the notches 68 of the locknut 66, which come into contact with the notches 72 of the washer 70. In the screwing of the locknut 66, the translation force which is applied to the washer 70 is maintained until the notches 68, 72 are in contact.

Figure 7:
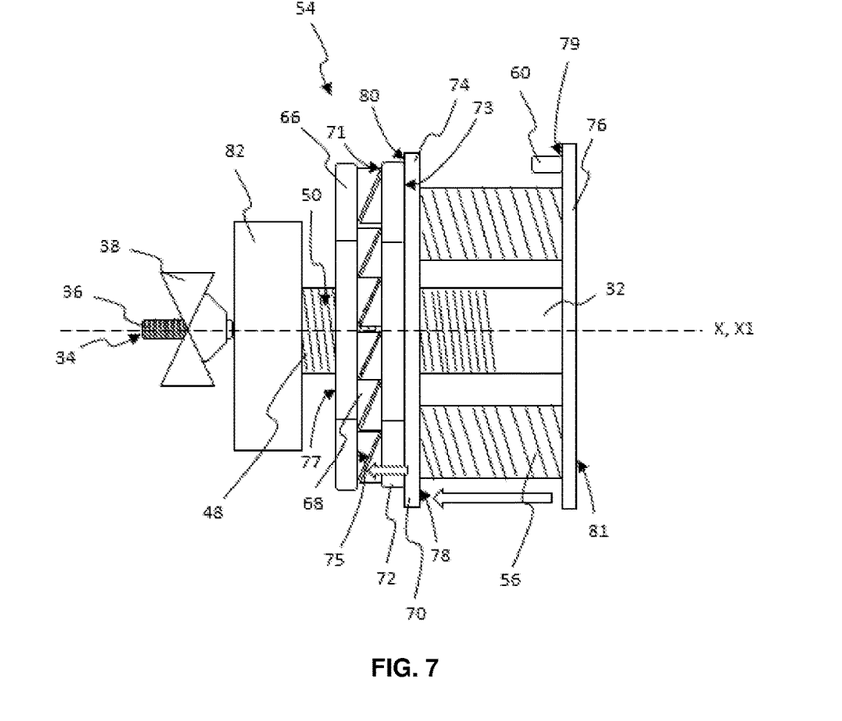
FIG. 7 is a cross-sectional view of a part of a device for handling a shaft forming a pivoting link between first and second parts, according to an embodiment of the invention.

Once the notches 68 of the locknut 66 are in contact with the notches 72 of the washer 70, the translation force which is applied to the washer 70 is relaxed, and the return force of the return means 56, which are compressed, causes rotational and translation movements of the washer 70 about and along the longitudinal axis X1, in the first direction F1. This makes it possible to make the notches 68 of the locknut 66 cooperate with the notches 72 of the washer 70. In fact, during the screwing of the locknut 66, the notches 68 may not be positioned perfectly in line with the notches 72 of the washer 70. As represented in FIG. 7, when the translation force applied to the washer 70 is relaxed, the latter, under the return force of the return means 56, is pushed towards the locknut 66, until the notches 68, 72 cooperate with one another. The return means 56 are then blocked in position of compression between retaining discs 74, 76.

A rotation of the washer 70 about the longitudinal axis X1, in the direction of the slope of the notches 68, 72, makes it possible to make the notches 72 of the washer 70 slip against the notches 68 of the locknut 66, until one notch 72 cooperates with another notch 68 (the next notch 68). The rotation of the washer 70 compresses the return means 56 (by the height of the notches). Upon the transition from one notch to the next notch, under the action of the return means 56 which are suddenly decompressed over a short distance (the height of the notches), the notches 72 of the washer 70 and the notches 68 of the locknut 66 strike against one another, which makes it possible to generate vibrations which are transmitted to the body 32, then to the shaft 10, through the expandable clamping ring 42, and to break the inter-granular cohesion between the shaft 10 and the parts 12, 14. The vibrations make it possible to reduce the load which is applied to the shaft 10.

Figure 8:
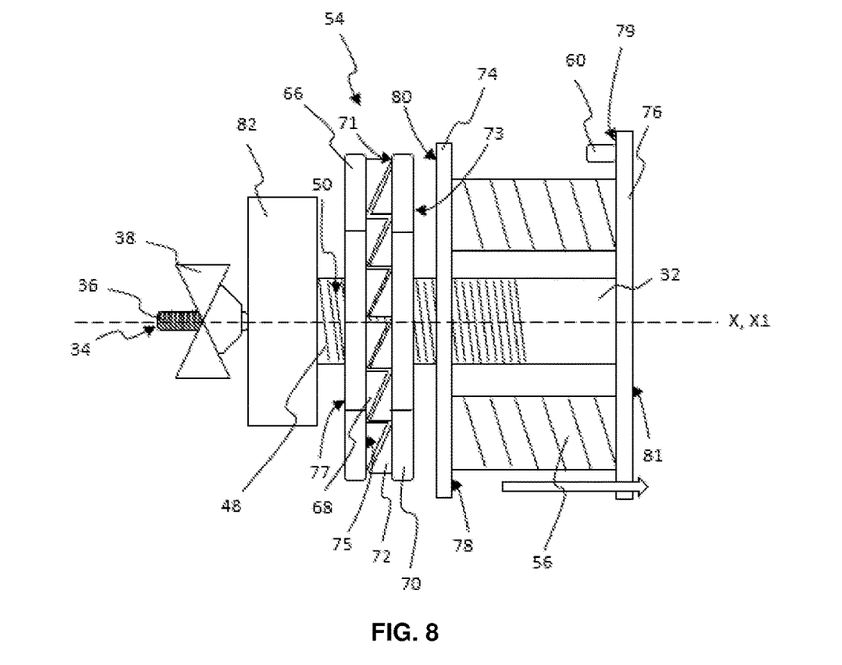
FIG. 8 is a cross-sectional view of a part of a device for handling a shaft forming a pivoting link between first and second parts, according to an embodiment of the invention.

The function of the return means 56 is then used. More specifically, the return means 56 will be decompressed by exerting their return force along the longitudinal axis X1 in the second direction F2, as represented in FIGS. 4 and 8 (detailed hereinabove). The decompression of the return means results from a combined action of the vibrations generated in the shaft 10 by the rotational movement of the washer 70 against the locknut 66 and of the alignment of the orifices 16, 18 of the parts 12, 14.

According to a configuration represented in FIGS. 5 to 8, the device 30 comprises a handle 82 arranged at the end 48 of the body 32, and secured to the body 32. This handle 82 facilitates the handling of the body 32. According to another configuration that is not represented, the handle 82 is arranged at the end 48 of the body 32, and secured to the locknut 66, so that a user of the device 30 uses the handle 82 to screw the locknut 66. According to another configuration that is not represented, the handle 82 and the locknut 66 form a single part and make it possible to maintain the position of the washer 70.

The maximum force applied to the device 30 depends on the characteristics of the return means 56 and on the maximum distance between the compression nut 54, and more specifically the washer 70, and the abutment 60. In fact, for given return means, with certain compression characteristics, when the return means are compressed over a given dimension, the value of the reaction force is proportional to the given dimension.

Figure 9:
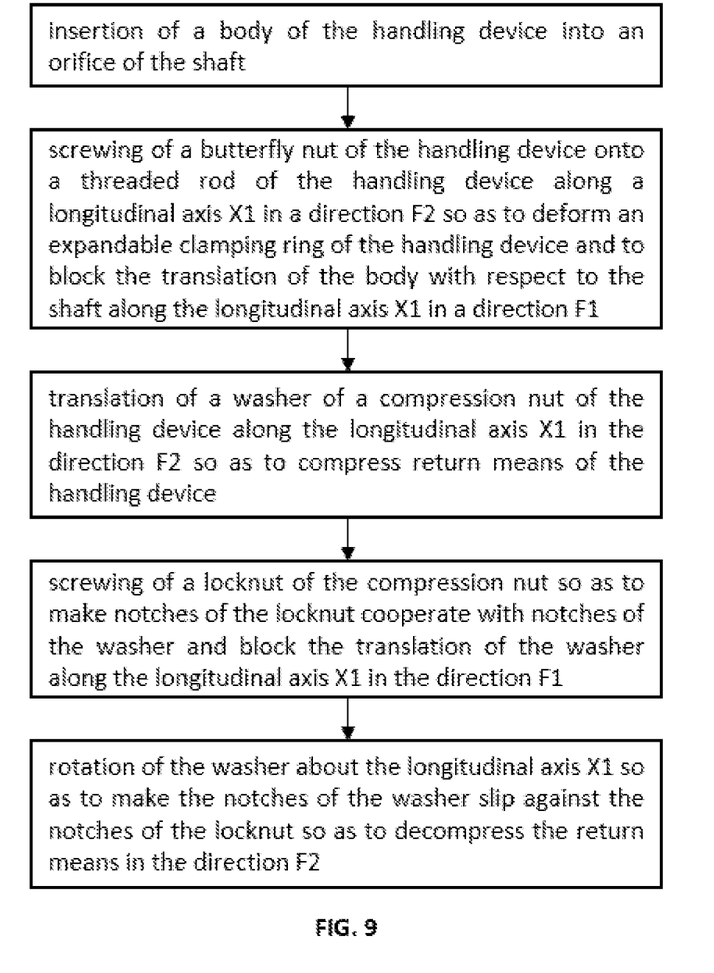
FIG. 9 is a flowchart of a method for handling a shaft forming a pivoting link between first and second parts, according to an embodiment of the invention.

A method for using the device 30 will now be described. The method is represented in FIG. 9.

For the insertion of the shaft 10 into the orifices 16, 18 of the parts 12, 14 so as to form the pivoting link, the use of the device 30 comprises a step of insertion of the body 32 into the orifice 11 of the shaft 10, then a step of screwing of the butterfly nut 38 onto the threaded rod 34 along the longitudinal axis X1 in the second direction F2, such that the tapered form of the nut 44 enters into contact with and deforms the groove or grooves 47 of the ring 46. Next, the use of the device 30 comprises a step of insertion, by slip fitting, of the assembly formed by the shaft 10 and the device 30 into the orifices 16, 18 of the parts 12, 14. The expandable clamping ring 42 makes it possible to center the shaft 10 upon its insertion. The handle 82 makes it possible to facilitate the use of the device 30. The use of the device 30 then comprises a step of unscrewing of the butterfly nut 38 of the threaded rod 34, such that the tapered form of the nut 44 leaves the groove or grooves 47 of the ring 46, and the ring 46 reverts to its non-deformed form. Next, the use of the device 30 comprises a step of translation of the body 32 along the longitudinal axis X1, in the first direction F1, so as to release the device 30 from the shaft 10. This step of releasing of the device 30 from the shaft 10 comprises a substep of translation of the washer 70 along the longitudinal axis X1 in the second direction F2 so as to compress the return means 56 between the compression nut 54 and the bearing member 58, until the abutment 60 is reached, then a substep of screwing of the locknut 66 onto the threaded outer portion 50 of the body 32 along the longitudinal axis X1 in the second direction F2, so as to make the notches 68 of the locknut 66 cooperate with the notches 72 of the washer 70 and block the translation of the washer 70 along the longitudinal axis X1 in the first direction F1, then a substep of rotation of the washer about the longitudinal axis X1 so as to make the notches 72 of the washer 70 slip against the notches 68 of the locknut 66 so as to decompress the return means 56 in the second direction F2 and drive the bearing member 58, and therefore the body 32, in translation along the longitudinal axis X1 in the first direction F1.

For the disengagement of the shaft 10 from the orifices 16, 18 of the parts 12, 14, the use of the device 30 comprises a step of insertion of the body 32 into the orifice 11 of the shaft 10 (represented in FIG. 1), then a step of screwing of the butterfly nut 38 onto the threaded rod 34 along the longitudinal axis X1 in the second direction F2, such that the tapered form of the nut 44 comes into contact with and deforms the groove or grooves 47 of the ring 46 (represented in FIG. 2). This screwing makes it possible to block the translation of the body 32 with respect to the shaft 10 along the longitudinal axis X1 in the first direction F1. The use of the device 30 then comprises a step of screwing of the compression nut 54 onto the threaded outer portion 50 of the body 32 along the longitudinal axis X1 in the second direction F2, so as to compress the return means 56 against the compression nut 54 and the bearing member 58 along the longitudinal axis X1 in the second direction F2, until the retaining disc 74 comes into contact with the abutment 60 (represented in FIG. 3). This step comprises a substep of translation of the washer 70 along the longitudinal axis X1 in the second direction F2, that is to say, towards the retaining disc 74 (represented in FIG. 5), then a substep of screwing of the locknut 66 so as to make the notches 68 of the locknut 66 cooperate with the notches 72 of the washer 70 and block the translation of the washer 70 along the longitudinal axis X1 in the first direction F1 (represented in FIG. 6), and finally a substep of rotation of the washer 70 about the longitudinal axis X1 so as to make the notches 72 of the washer 70 slip against the notches 68 of the locknut 66. This makes it possible to gradually compress the return means 56. Upon the transition from one notch to the next notch, the notches 68, 72 strike against one another under the action of the return means 56 which exert their return force on the washer 70 towards the locknut 66. In fact, the return means 56 are decompressed suddenly over a short distance, which generates vibrations in the body 32, which are transmitted to the shaft 10. These vibrations make it possible to break the chemical links which may exist between the shaft 10 and the parts 12, 14. The use of the device 30 comprises a step of decompression of the return means 56, by exerting a return force along the longitudinal axis X1 in the second direction F2, so as to drive the bearing member 58, and therefore the body 32 and the shaft 10, in translation along the longitudinal axis X1 in the first direction F1 (represented in FIG. 4). The decompression of the return means 56 results from a combined action of the vibrations generated by the movement of the washer 70 between the locknut 66 and the return means 56 and of a correct alignment of the orifices 16, 18 of the parts 12, 14 with the shaft 10. In fact, as long as the alignment of the orifices 16, 18 of the parts 12, 14 and the shaft 10 is not correct, the shaft 10 cannot be removed because of the load applied by the device 30. As soon as the alignment is correct, the load applied by the return means 56 is sufficient to extract the shaft 10 from the orifices 16, 18 of the parts 12, 14 (if there are no more chemical links and there is no corrosion between the shaft 10 and the parts 12, 14).

These steps can be repeated if necessary, in order to sufficiently disengage the shaft 10 from the orifices 16, 18 of the first and second parts 12, 14. In particular, the shaft 10 is not completely withdrawn from the orifices 16, 18 of the first and second parts 12, 14 in the use of the device 30. Once the return means 56 are decompressed, the orifices 16, 18 of the parts 12, 14 are sufficiently aligned to allow an effort-free extraction of the shaft 10. The device 30 is then removed, by hand by an operator, by using the handle 82. Since the device 30 is linked to the shaft 10, via the expandable clamping ring 42, the shaft 10 is entirely extracted from the orifices 16, 18 of the parts 12, 14 during the removal of the device 30.

During the insertion and screwing steps, a high constant load is applied to the shaft 10. The vibrations generated by the rotational movement of the washer 70 make it possible to reduce the load which is applied to the shaft 10, and thus extract the shaft 10 automatically from the orifices 16, 18 of the parts 12, 14. Once the load is reduced, the function of the return means 56 is used to disengage the shaft 10 from the pivoting link.

This device 30 thus makes it possible to handle the shaft 10 simply and rapidly, and to control the load applied to the shaft 10 and to the surface 23.1 of the part 12 during the handling (insertion and extraction) of the shaft 10. Furthermore, this device 30 makes it possible to generate no damage to the first and second parts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for handling a shaft having an orifice emerging at its center and forming a hollow shaft and a link between first and second parts, the device comprising:
   a body extending along a longitudinal axis, configured to be inserted into the orifice, the body having a threaded outer portion and a bore extending along the longitudinal axis,
   a threaded rod inserted into the bore of the body and having first and second ends,
   a butterfly nut mounted to translate by screwing onto the first end of the threaded rod along the longitudinal axis in a second direction,
   an expandable clamping ring arranged on the second end of the threaded rod, and deformable under action of the butterfly nut between a free position in which the body can move in translation with respect to the shaft along the longitudinal axis and a deformed position in which the translation of the body with respect to the shaft along the longitudinal axis in a first direction opposite the second direction is blocked,
   a compression nut screwed onto the threaded outer portion of the body along the longitudinal axis in the second direction,
   a bearing member configured to be positioned against one of the first or second parts, and
   return means positioned between the compression nut and the bearing member and configured to be compressed between the compression nut and the bearing member by the screwing of the compression nut and to be decompressed in the second direction under the action of the compression nut.

2. The device according to claim 1, wherein the compression nut comprises:
   a washer movable in translation along the longitudinal axis and in rotation about the longitudinal axis, and comprising notches, and
   a locknut screwed onto the threaded portion of the body and comprising notches of a form complementing a form of the notches of the washer, the notches of the locknut being configured to cooperate with the notches of the washer to block the translation of the washer along the longitudinal axis in the first direction.

3. The device according to claim 1, wherein the expandable clamping ring comprises:
   a nut of tapered form bedded onto the second end of the threaded rod, and
   a ring that can be deformed in a direction transversal to the longitudinal axis and having at least one groove, the ring being secured to the body,
      the groove of the ring being configured to be deformed by the tapered form of the nut during the screwing of the butterfly nut.

4. The device according to claim 1, comprising an abutment configured to stop a compression of the return means.

5. The device according to claim 1, comprising a handle arranged at an end of the body.

6. A method for handling a shaft having an orifice emerging at its center and forming a hollow shaft and a link between first and second parts, by means of a handling device comprising a body extending along a longitudinal axis and having a threaded outer portion and a bore extending along the longitudinal axis, a threaded rod inserted into the bore of the body and having first and second ends, a butterfly nut screwed onto the first end of the threaded rod, an expandable clamping ring arranged on the second end of the threaded rod, a compression nut comprising a washer comprising notches and a locknut screwed onto the threaded outer portion of the body and comprising notches of a form complementing a form of the notches of the washer, a bearing member positioned against one of the first or second parts, and return means positioned between the washer and the bearing member, the method comprising the steps of:
   inserting the body into the orifice;
   screwing the butterfly nut onto the threaded rod along the longitudinal axis in a second direction to deform the expandable clamping ring and to block a translation of the body with respect to the shaft along the longitudinal axis in a first direction opposite the second direction;
   translating the washer along the longitudinal axis in the second direction to compress the return means;
   screwing the locknut to make the notches of the locknut cooperate with the notches of the washer and block the translation of the washer along the longitudinal axis in the first direction; and rotating the washer about the longitudinal axis to make the notches of the washer slip against the notches of the locknut to decompress the return means in the second direction.

* * * * *